(12) United States Patent
Fischer (10) Patent No.: US 6,807,189 B1
(45) Date of Patent: Oct. 19, 2004

(54) METHOD FOR REDUCING COLLISIONS, LATENCY AND LATENCY JITTER IN A NETWORK BY MAINTAINING A CONTENTION-RESOLUTION DERIVED QUEUE ORDERING

(75) Inventor: Matthew J. Fischer, Mountain View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/545,514

(22) Filed: Apr. 7, 2000

Related U.S. Application Data (60) Provisional application No. 60/128,691, filed on Apr. 9, 1999.

(51) Int. Cl.[7] .................................................. H04L 1/08
(52) U.S. Cl. ....................................................... 370/447
(58) Field of Search ................................ 370/229, 445, 370/447, 448

(56) References Cited

U.S. PATENT DOCUMENTS

| | | | | |
|---|---|---|---|---|
| 4,593,282 A | * | 6/1986 | Acampora et al. ........ 340/825.5 |
| 4,736,371 A | * | 4/1988 | Tejima et al. ................ 370/236 |
| 4,847,835 A | * | 7/1989 | Le Lann et al. ............. 370/447 |
| 5,230,044 A | * | 7/1993 | Cao et al. ..................... 710/123 |
| 5,436,903 A | * | 7/1995 | Yang et al. ................... 370/448 |
| 5,854,900 A | * | 12/1998 | Kalkunte et al. ............ 709/238 |
| 5,894,559 A | * | 4/1999 | Krishna et al. .............. 709/253 |
| 5,963,560 A | * | 10/1999 | Kalkunte ..................... 370/448 |

* cited by examiner

*Primary Examiner*—Huy D. Vu
*Assistant Examiner*—Daniel Ryman (57) ABSTRACT

A network interface examines a field of a successfully transmitted frame following a contention resolution and transmission ordering among a plurality of nodes contending for transmission of a frame. The field indicates whether the successfully transmitting node has any additional frames to transmit. The number of backoff slots is maintained at a current value, rather than decremented, if the field indicates that the successfully transmitting node has an additional frame to transmit. The next frame to be transmitted is assigned the highest backoff slot. This procedure avoids re-contention and re-ordering when the contending nodes have additional frames to transmit, thereby improving overall network performance.

14 Claims, 6 Drawing Sheets

| | SLOT ZERO | SLOT ONE | SLOT TWO | SLOT THREE | | |
|---|---|---|---|---|---|---|
| | 0-9 | | | | | |
| | 0,4,8 | 1,9 | 2,3 | 5,6,7 | | |
| | 0,4 | 8 | 1,9 | 2,3 | 5,6,7 | |
| | 4 | 0 | 8 | 1,9 | 2,3 | 5,6,7 |
| | 0 | 8 | 1,9 | 2,3 | 5,6,7 | 4 |
| | 8 | 1,9 | 2,3 | 5,6,7 | 4,0 | |
| | 1,9 | 2,3 | 5,6,7 | 4,0,8 | | |
| | 9 | 1 | 2,3 | 5,6,7 | 4,0,8 | |
| | 1 | 2,3 | 5,6,7 | 4,0,8,9 | | |
| | 2,3 | 5,6,7 | 4,0,8,9 | | | |
| | 4,0,8,9,1,2,3,5,6,5 | | | | | |
| | 1,6,8 | 2,3,9 | 0,5 | 4,7 | | |
| | 6 | 1,8 | 2,3,9 | 0,5 | 4,7 | |
| | 1,8 | 2,3,9 | 0,5 | 4,7 | 6 | |
| | 1 | 8 | 2,3,9 | 0,5 | 4,7 | 6 |
| | 8 | 2,3,9 | 0,5 | 4,7 | 6,1 | |

FIG. 4

TIME

|  | SLOT ZERO | SLOT ONE | SLOT TWO | SLOT THREE | | | | | |
|---|---|---|---|---|---|---|---|---|---|
| | 0-9 | | | | | | | | |
| | 0,4,8 | 1,9 | 2,3 | 5,6,7 | | | | | |
| | 0,4 | 8 | 1,9 | 2,3 | 5,6,7 | | | | |
| | 4 | 0 | 8 | 1,9 | 2,3 | 5,6,7 | | | |
| | 0 | 8 | 1,9 | 2,3 | 5,6,7 | 4 | | | |
| | 8 | 1,9 | 2,3 | 5,6,7 | 4 | 0 | | | |
| | 1,9 | 2,3 | 5,6,7 | 4 | 0 | 8 | | | |
| | 9 | 1 | 2,3 | 5,6,7 | 4 | 0 | | | |
| | 1 | 2,3 | 5,6,7 | 4 | 0 | 8 | 9 | | |
| | 2,3 | 5,6,7 | 4 | 0 | 8 | 9 | 1 | | |
| | 4 | 0 | 8 | 9 | 1 | 3 | 2 | 5 | 7 | 6 |
| | 0 | 8 | 9 | 1 | 3 | 2 | 5 | 7 | 6 | 4 |
| | 9 | 1 | 3 | 2 | 5 | 7 | 6 | 4 | 0 | 8 |
| | 1 | 3 | 2 | 5 | 7 | 6 | 4 | 0 | 8 | 9 |
| | 3 | 2 | 5 | 7 | 6 | 4 | 0 | 8 | 9 | 1 |

METHOD FOR REDUCING COLLISIONS, LATENCY AND LATENCY JITTER IN A NETWORK BY MAINTAINING A CONTENTION-RESOLUTION DERIVED QUEUE ORDERING

RELATED APPLICATIONS

This application claims priority of provisional application Ser. No. 60/128,691, filed on Apr. 9, 1999.

FIELD OF THE INVENTION

The present invention relates to communication networks, and more particularly, to methods for minimizing collisions, frame-delivery latency and frame-delivery latency jitter in a network.

BACKGROUND OF THE INVENTION

Various network protocols have been created for the purposes of transmitting data and voice and video information from one location to another. Among these are protocols that are intended to operate within a shared medium network. Most shared-medium network protocols are built with the expectation that collisions will occur as multiple nodes of the network contend for use of a portion of the overall network bandwidth.

A contention resolution phase normally follows a collision, and is intended to sort a single "winner" from the set of colliding nodes. There are various methods for sorting out the winners and losers of the contention phase. Several successive collisions may be incurred before a wining node is finally selected. At that point, collisions will cease temporarily, as the winning node will be the only node allowed to transmit. However, most protocols do not attempt to sort the winners from the losers in an orderly fashion, and hence, immediately after the completion of the single winning transmission, it is likely that yet another collision resolution phase will begin with the winning node immediately re-appearing in the contention process. The previous winner may well end up being the winner again, and then would be allowed to transmit a second frame before other nodes have been allowed to transmit even one frame. Over long periods of time, each node has an equal chance of becoming the winner, but for shorter periods of time, unfairness can arise, leading to large variations in average latency of delivery. The effect of network capture within the Ethernet protocol offers a common example of this sort of behavior.

More advanced network protocols force the winner of a contention resolution phase to be removed from the next contention round until each competitor for network resources has had an opportunity to transmit a frame. This approach delivers much more satisfactory performance as measured by the deviation from average latency. But even in the case where a random succession of winners may have been chosen with previous winners being denied access until all have participated, the resolution state information, specifically, the contention-resolution-derived transmission ordering, is not preserved by the network. Therefore, following each set of orderly transmissions, the network again resorts to a phase of collision resolution, where all previous winners are once again asked to re-contend for the network. Clearly, the allowance for a set of transmissions following each contention resolution phase offers much improvement over older network behaviors, yet additional improvement can be made.

The resolution of collisions imposes a direct cost upon the network. Specifically, a certain amount of network bandwidth is lost to the transmission of colliding frames and to the process of resolving the collisions. Furthermore, the resolution cycles usually employ random processes, such that there can often be a substantial time-variance in the duration of the contention resolution phase. This time-variance in the collision resolution process directly impacts the time-variance of the average frame delivery latency. With increasing demands from network users for more and more latency-sensitive data streams (e.g., real-time video and audio streams), frame delivery latency variance becomes a very important parameter of network behavior. The smaller the delivery latency variance, the better the performance of the network for the delivery of these streams, the less buffering that will be required, and the more valuable the network will be.

SUMMARY OF THE INVENTION

Some shared medium network protocols create a transmission ordering by using an n-ary tree method of collision resolution that eventually selects a series of network contention winners. A network variable is maintained by each node of the network in order to track the progress of the contention resolution mechanism. The variable indicates the current depth of the n-ary tree. It is maintained so that newly queued frames will be placed at the tail of the queue of nodes that are offering frames for transmission. This network variable resolves to zero following the complete resolution of any given network contention resolution phase. The invention improves such protocols by adding a MORE field to each outgoing frame. The MORE field instructs all receiving nodes (and the sending node) to leave the network variable for the n-ary tree at its current depth when it would otherwise have reduced the depth due to the passage of a successful transmission or reception. The MORE field is only set in outgoing frames when the currently transmitting node has another frame in its transmit queue. The conveyance of this information implies that the depth of the n-ary tree will remain the same because the removal of an entry at the head of the network queue will be countered by the addition of an entry at the tail of the queue. Because the n-ary tree resolves to a queue of singular width at the head end, entries placed at the tail of the queue by the immediately preceding transmitter are also singular in width. As a result, when provided with a steady flow of frames at each node's transmission queue, the network behavior resolves to that of a highly ordered contention-free protocol, with the overhead and time-variance of the collision resolution process having vanished. Networks containing a mixture of nodes with empty and non-empty transmission queues show a mixed behavior, but with a general reduction in overhead due to the reduced requirement for collision resolution. Networks that have any nodes with multiple-entry transmission queues will show a benefit from the invention when the performance metrics of average latency, latency jitter and throughput are measured.

The foregoing and other features, aspects and advantages of the present invention will become more apparent from the following detailed description of the present invention when taken in conjunction with the accompanying drawings.

DETAILED DESCRIPTION OF THE INVENTION

The present invention addresses and solves problems related to contention resolution protocols on a shared-medium access network, and in particular to those that require re-contention for access to the medium to transmit additional frames following an initial process of collisions, contention resolution and transmission ordering of an initial set of transmission frames. The methods and apparatus of the present invention preserve the n-ary tree contention-resolution-transmission ordering created during a collision resolution of an initial set of frames that collided. By maintaining the ordering created during the initial collision resolution procedure, re-contention and its associated costs for resolution of the collisions is avoided, thereby improving overall network performance.

Figure 1:
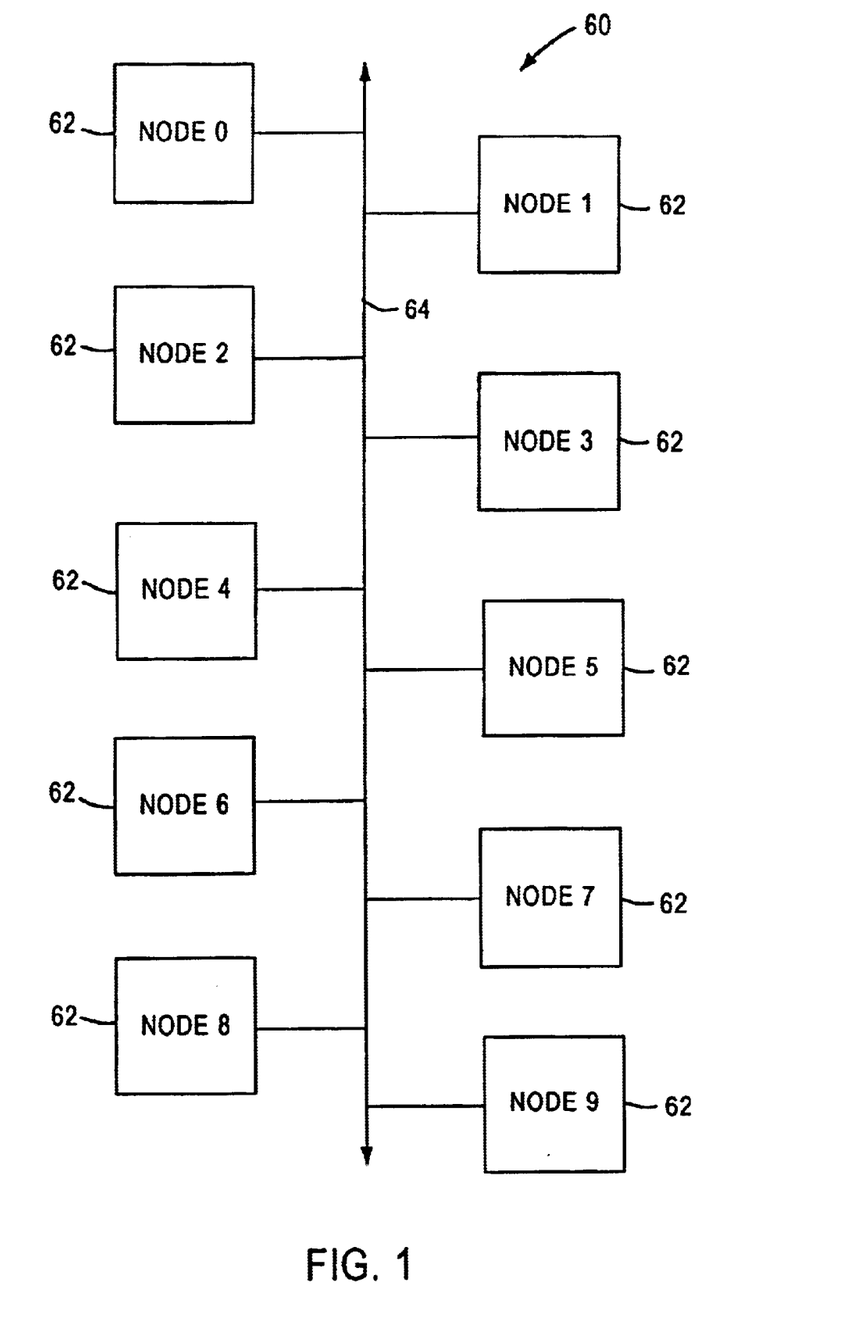
FIG. 1 is a block diagram of a network in accordance with embodiments of the present invention.

FIG. 1 is a block diagram of a communication network 60 that uses the embodiments of the present invention. The communication network 60 includes a plurality of nodes 62 coupled to a shared medium 64. In the following description, the nodes 62 will be designated as nodes 0–9 to reference different individual nodes.

Before describing the method for reducing collisions, latency and latency jitter of the present invention, an exemplary embodiment of a network interface that is configured to perform in accordance with the embodiments of the invention will be described with respect to FIG. 2.

Figure 2:
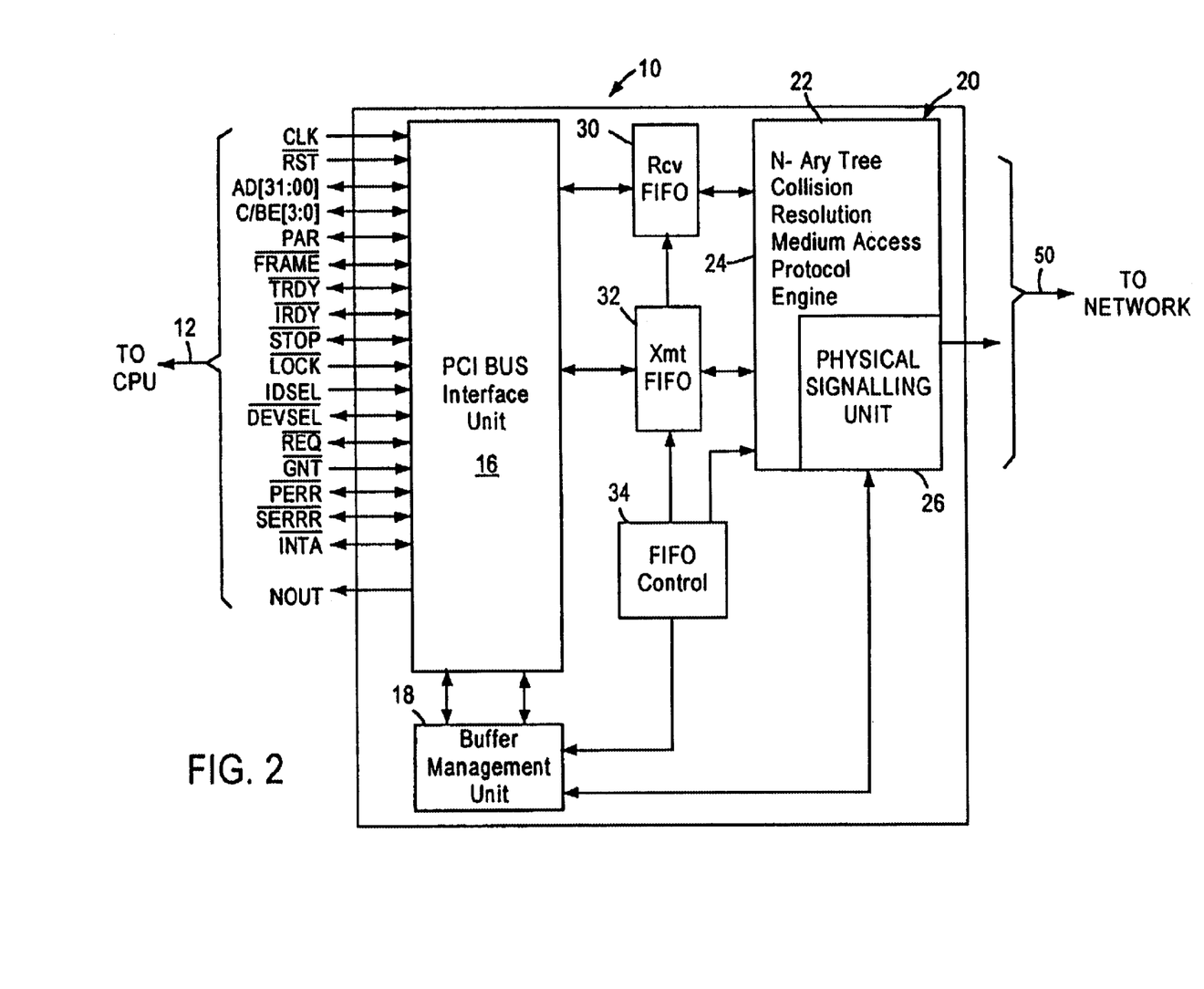
FIG. 2 is a block diagram of a network interface in accordance with embodiments of the present invention.

FIG. 2 is a block diagram of an exemplary network interface 10 that accesses the media of a network according to an embodiment of the present invention.

The network interface device 10 provides an interface between a local bus 12 of a computer, for example, a peripheral component interconnect (PCI) local bus, and an n-ary tree collision resolution medium access protocol style network 50.

The interface 10 includes a PCI bus interface unit 16, a direct memory access (DMA) buffer management unit 18, and a network interface portion 20 including an n-ary tree collision resolution MAC protocol engine 22 and a physical signaling unit 26. The interface 10 also includes a receive first in first out (FIFO) buffer 30, a transmit FIFO buffer 32, and a FIFO controller 34.

The PCI bus interface unit 16, compliant with the PCI local bus specification (revision 2.1), receives data frames from a host computer's CPU via the PCI bus 12. The PCI bus interface unit 16, under the control of the DMA buffer management unit 18, receives DMA and burst transfers from the CPU via the PCI bus 12. The data frames received from the PCI bus interface unit 16 are passed on a byte-by-byte basis to the transmit FIFO 32.

The buffer management unit 18 manages the reception of the data by the PCI bus interface unit 16 and retrieves information from header bytes that are transmitted at the beginning of transmissions from the CPU via the PCI bus 12. The header information identifying the byte length of the received frame is passed to the FIFO control 34.

The present invention improves upon shared-medium network protocols that create a transmission ordering following an initial collision event. Hence, a known network protocol will be discussed first, prior to discussing the improvement provided by the present invention. The exemplary transmission ordering of the known protocol will be described first in general terms, followed by an example with specific nodes.

In n-ary tree transmission-ordering protocols, each node is placed into a "backoff slot". Nodes with the lowest numbered backoff slot will transmit first. As successful transmissions occur, each node reduces its backoff slot number. As collisions occur, nodes will increase their backoff slot number. The collision resolution protocol fairly assigns backoff slot numbers to each node through a random assignment process. The resolution process ensures that at some point, a single node will occupy the lowest backoff slot number, thereby allowing that node to make a contention-free transmission.

All nodes begin with a backoff slot number of zero. The transmission ordering is created through the outcome of a succession of n-ary tree resolution, where the contending nodes (those with a backoff slot number of zero) each choose a random contention integer in a small range of integers (0 through n−1) following each collision. After the selection of the random integers, only those nodes that have chosen the smallest value that was selected by any competing node will be allowed to re-contend for the network. The smallest value selected may or may not be the smallest value in the range. There may be a tie. For example, if the range is 0 through 3, and five nodes select a contention integer, then it is possible that the tying winners have selected the value of 1, while the other nodes have selected values of 2 and 3.

In order to determine the winner(s) of the selection process, each node signals its randomly selected contention integer in a specific network time window following the collision. There is a separate time window for each chosen contention integer. Multiple nodes may signal the selection of the same contention integer. Each node also monitors the network to determine the contention integer values chosen by other nodes. Even nodes that were not participants in the collision must monitor the network, and nodes that have empty transmission queues must monitor the network. All nodes count the total number of contention integer values that were selected by all participants by examining the network signaling. All nodes count the total number of integer values chosen, not the total of the integers. Each node increments its original backoff slot number in the following manner:

If the backoff slot number for the node was zero and a collision occurred, then the node randomly chose a new integer and signaled its value. Such a node increments the backoff slot number with a value equal to the total number of contention integers that have a value of less than the contention integer chosen by this node. If the node is a winner (or has tied for a win) in this round, then no other nodes have chosen an integer of smaller value, and hence the backoff slot number for this node remains at zero. If the node was not a winner, then at least one other node must have chosen a smaller integer. The losing node will see the signal indicating the presence of a node having selected a smaller integer. The losing node will be required to increment its backoff slot number by at least one (it may have lost to more than one contention position and in such case will need to increment its backoff position by more than one). After doing so, the winner will still be at backoff slot number zero, and any losers will be at least at backoff slot number one, or higher.

If a node was a contender in this round of collision resolution, but it has discovered that at least one other node has chosen an integer that was smaller, then it is a loser in this round. As a result, this node's backoff slot number advances from zero to some larger value which represents the number of groups of nodes that placed higher than this node in the competition just concluded.

If the backoff number for the node was non-zero, then the node was not a contender in this resolution round. Only nodes with backoff slot number equal to zero are allowed to participate in a round of contention. A non-contending node increments the backoff slot number with a value of one less than the total number of integers selected by the contending nodes. This advances the non-contending node's position in the queue to something beyond all of the contenders from this just-competed round of contention resolution. That is, all of the losers of the current round remain ahead of those that did not even compete in this round.

Following a round of contention resolution, all nodes with a backoff slot number of zero will transmit their frame. The result will be a new collision if there was a tie. A new collision produces a new round of collision resolution. The resolution of collisions proceeds in this fashion until there is no tie for the winning node. The winning node transmits its frame with no resulting collision. All nodes with a backoff slot number greater than zero may now reduce their backoff slot numbers by one. Some group of nodes will now have a backoff slot number of zero, and this group is next given permission to attempt a transmission. If the group consists of a single node, then another contention-free transmission occurs. If the group contains more than a single node, then another collsion, followed by another round of contention occurs.

Following the successful transmission of a frame, a transmitting node potentially queues a new frame for transmission. At this point, other nodes of the original group of network contenders may not yet have had an opportunity to transmit their frames. They remain lined up and waiting with their respective backoff slot numbers, some of which may be shared by other nodes. As each slot number is decremented to zero, additional rounds of contention may be required to separate the nodes that are sharing backoff slot numbers.

In order to prevent the node that has just completed its winning transmission from immediately competing with the remaining line of nodes, a fairly-designed protocol will provide a mechanism for forcing each successive winner to take a backoff slot number which places it at the effective end of the line of waiting nodes.

This goal is achieved by forcing all nodes at all times to keep track of the number of the groups of nodes that are waiting in the queue, where a group of nodes is any set of nodes that possesses the same backoff slot number. The count of groups of nodes can be labeled as the "highest_ backoff_slot_occupied". Assuming that all nodes begin with the same value of backoff slot (i.e. zero), then this number is easy to track by all nodes. The tracking of this value is very similar to the generation of increasing backoff slot numbers by the nodes, with the exception that when the node's backoff slot number is zero, the number of integers chosen by the competing nodes is added to the highest_ backoff_slot_occupied variable, rather than just the number of integers that were smaller than this node's selection. When the node's backoff slot number is non-zero, the rule for incrementing the highest_backoff_slot_occupied is the same as the rule for incrementing the backoff slot number. And similarly, whenever a frame is successfully transmitted by any node in the network, the highest_backoff_slot_ occupied is decremented along with the backoff slot number for any queued and waiting frame.

There may not actually be a frame queued in the highest_ backoff_slot_occupied backoff slot at all times. Immediately following a multi-way collision, when no winner has yet been selected, the highest_backoff_slot_occupied backoff slot will be empty. The highest_backoff_slot_ occupied backoff slot will become occupied when a winner from the contention has transmitted its frame and then discovers that it has another frame queued for transmission or when a non-competing node queues a frame for transmission. If no winners or non-competing nodes have additional frames queued for transmission, then the highest_ backoff_slot_occupied backoff slot will remain empty.

All nodes must track the highest_backoff_slot_ occupied variable, even when they do not have a frame ready for transmission. When any node has a new frame for transmission, it assigns that frame a backoff slot number equal to the highest_backoff_slot_occupied. This effectively places the frame at the end of the waiting queue.

Since the highest_backoff_slot_occupied value is tracked by all nodes in the network using the same rules, all nodes have the same value for this variable. Hence, all frames newly queued for transmission will be given the exact same backoff slot number by any node in the network. Once each of the nodes in the original group of contending nodes has been given a chance to transmit a frame, all of the nodes that have a new frame queued will arrive at backoff slot number zero together. There will be a new collision involving all of the nodes from the original group, or at least as many of them as queued a new frame after their previous frame was transmitted, plus any previously non-contending nodes that queued a frame for transmission during the previous contention resolution cycle.

A new set of collision resolution phases will begin. This set will resemble the original round in terms of average time to resolve each group of winners, if the number of contending nodes is similar.

Figure 3:
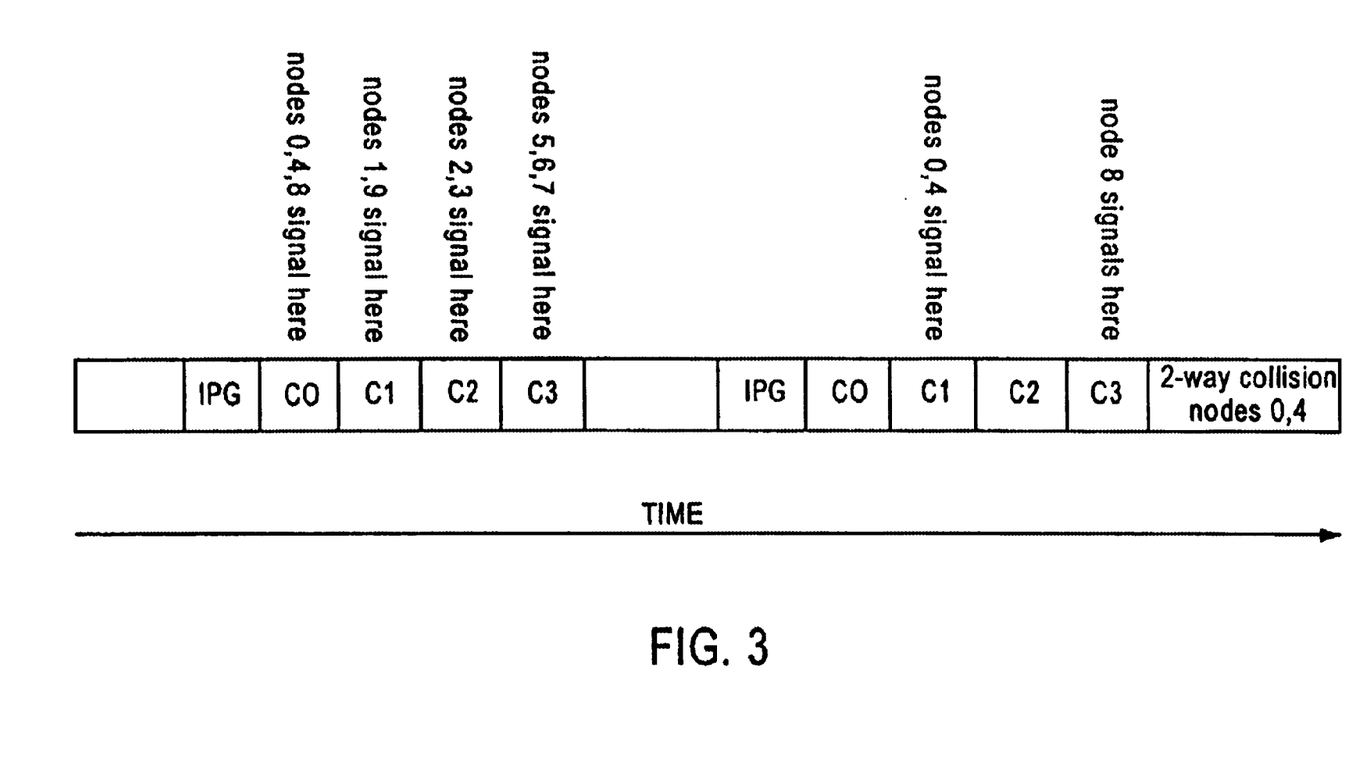
FIG. 3 is a diagram that depicts general behavior of a protocol that creates an ordered transmission queue of contending nodes using an n-ary tree method of collision resolution.

FIG. 3 shows an example of specific behavior of colliding nodes during a series of contention resolutions iin accordance with the described MAC protocol. Initially, ten nodes (0–9) have a transmission queued. After an initial ten-way collision involving nodes 0 through 9, each node selects a contention integer number in the range [0, n−1] and then signals its choice in the contention slots marked 0 through n−1. For the case shown, n=4. In the first round of contention, in this example, nodes 0, 4 and 8 are the winning nodes. Since there is more than one winner, there will be another collision in the highest priority transmission slot that immediately follows the last contention slot. Following the collision, there will be another round of contention. The nodes that were losers in the first round of contention must increase their backoff slot numbers from zero because they detected contention integer values that were smaller than their contention integer values as evidenced by the presence of signals in contention slots that preceded their contention slots. It should be remembered that backoff slot numbers are not the same as priority slot numbers.

Figure 4:
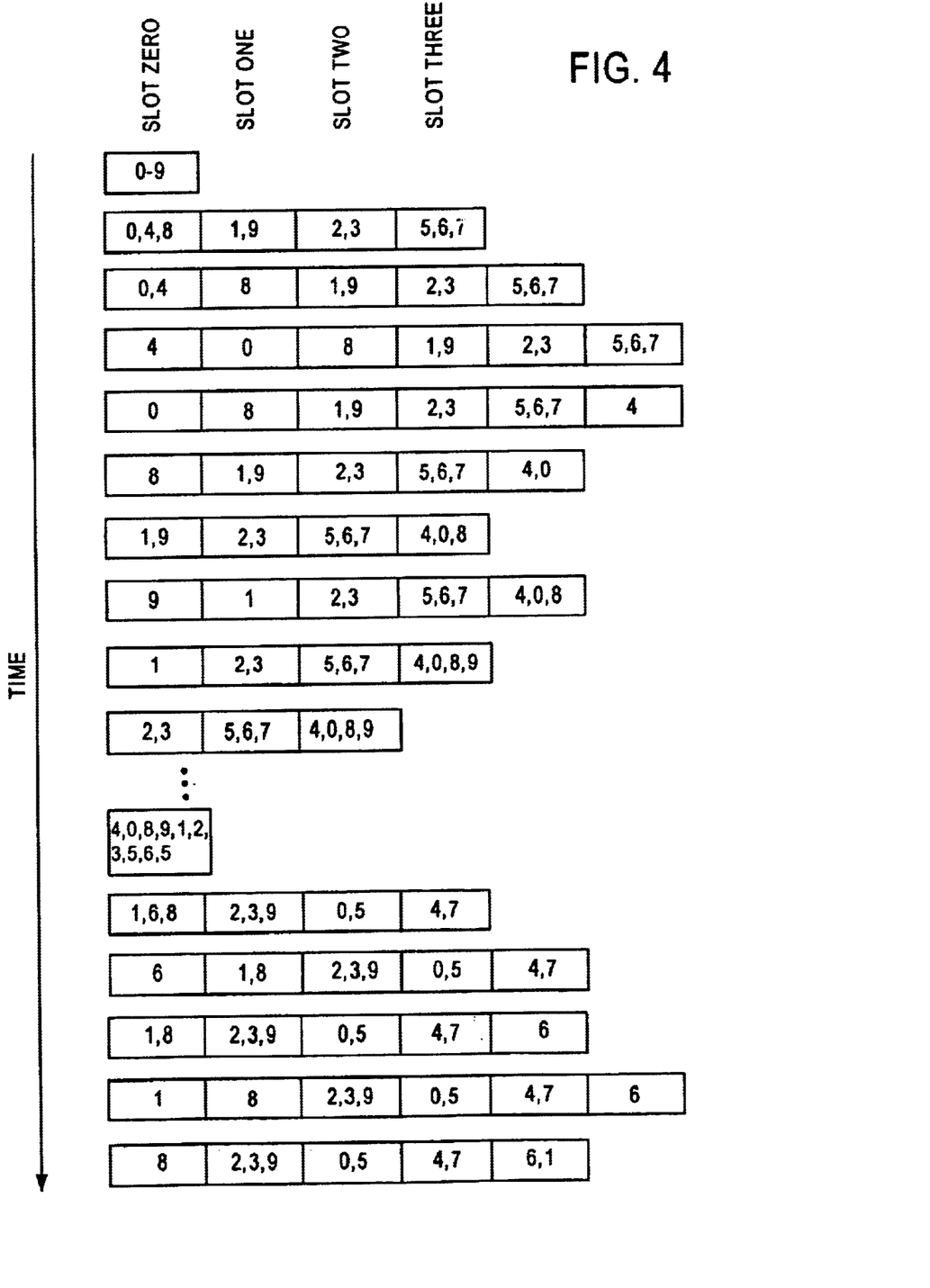
FIG. 4 is a diagram that depicts an example of node ordering created when a winner of each contention is removed from the contention process until all nodes have been declared winners in turn.

In order to explain the above-described process more clearly, a full round of resolutions will be described. FIG. 4 shows the process of successive collisions and transmissions and the queue ordering that is created as a result of this resolution process. The same interaction involving ten nodes is depicted. In the first row of the diagram, all nodes are assigned backoff slot zero. All nodes subsequently attempt a transmission and suffer a ten-way collision. All nodes then draw a contention integer from the range 0 through (4−1)=3. Nodes 0, 4 and 8 have drawn the smallest valued contention integer of the group; in this case, contention integer value 0. Nodes 1 and 9 have selected the next smallest contention integer. Nodes 2 and 3 have chosen the next smallest. Nodes 5, 6 and 7 have selected the highest contention integer of the ten contending nodes.

Following the contention integer selection, each node signals its selection to the network so that other nodes can learn which values have been chosen. In this way, nodes 1, 2, 3, 5, 6, 7 and 9 learn that at least one node has chosen a smaller contention integer. Each of these nodes increments its backoff slot number accordingly.

Nodes 1 and 9 saw one contention integer signal arrive at a time earlier than their signal (these nodes observed the signal for contention integer zero that was chosen by nodes 0, 4 and 8) and hence, they increment their backoff slot numbers from zero to one. Nodes 1 and 9 also observed the signals from nodes 2, 3, 5, 6 and 7 that occurred after their signal, but because these signals occurred after the signals for nodes 1 and 9, they are ignored.

Nodes 2 and 3 observed two contention integer signals arrive at a time earlier than their signal, (these nodes observed the signal for contention integer zero that was chosen by nodes 0, 4 and 8, and they observed the signals emitted by nodes 1 and 9) and hence, these nodes increment their backoff slot numbers from zero to two.

Nodes 5, 6 and 7 observed three contention integer signals arrive at a time earlier than their signal, (from nodes 0, 4 and 8, and from nodes 1 and 9, and from nodes 2 and 3) and hence, these nodes increment their backoff slot numbers from zero to three.

The situation depicted in row two of FIG. 4 reflects this result. Because nodes 0, 4 and 8 have all selected the smallest contention integer for the group, these three nodes leave their backoff slot number un-altered at the value of zero, and hence these three nodes will all again attempt a transmission and will all experience a new collision. Only nodes with backoff slot number of zero are allowed to transmit following the last contention slot. The other seven nodes will wait until nodes 0, 4 and 8 have each been chosen in turn as a contention winner and have each transmitted without collision, before the protocol will allow their backoff slot numbers to be decremented to zero. Once their backoff numbers reach zero, the nodes will have an opportunity to transmit. This process is depicted in FIG. 4. The other nodes having originally chosen higher backoff numbers must monitor the network for contention number selection announcements, collisions and transmissions in order to properly determine whether to increment, decrement or do nothing to the current backoff slot position.

In the next row, nodes 0 and 4 have selected the lowest backoff slot chosen for this contention round. Node 8 has selected a higher value. Nodes 1 and 9, no longer contending, have seen the signals for both node 0 and 4 and for node 8. Nodes 1 and 9, (as well as 2, 3, 5, 6, 7) will each count the number of signals seen and increment their backoff slot numbers by that number minus one. In this case, two signals were seen, reflecting the two choices of contention integer that were chosen, so each of the sets of nodes that is not contending will increase its backoff slot number by two minus one =one. As can be observed, nodes 1 and 9 have indeed moved from backoff slot number one to backoff slot number two. Similarly, nodes 2, 3, 5, 6 and 7 have moved farther back.

Because nodes 0 and 4 have each selected the same value, they will again experience a collision. After one more round of backoff slot selection nodes 4 and 0 have chosen different values and a winner has been chosen. It is quite probable that they had instead chosen the same contention integer yet another time and collided one more time. In the example shown, node 4 chooses a lower contention integer and as a result, it is alone in the lowest numbered backoff slot in row 4 of FIG. 4. Node 4's next transmission attempt will be without collision.

Node 4 has also been monitoring the activity on the medium. Because of this, node 4 recognizes the end of the current queue, and after transmitting, node 4 will move to the back of the queue, provided that there is another frame for transmission in the queue of node 4. If there were no additional frame, node 4 would simply not re-enter the queue at this time, but whenever a frame became available, node 4 would re-enter the queue.

As time advances, additional phases of resolution are executed, with individual nodes being selected as the winner in turn. In the diagram shown, each winner has another frame in its transmission queue, and therefore, each winner places itself at the back of the existing queue.

After all nodes have been elected winner one time, all nodes find themselves at backoff slot number 0 again. Because no node is aware of any other node's transmission queue status, all nodes have taken the same position in the queue. All nodes possessing a second frame will now transmit their second frame at the same time, creating a new ten-way collision followed by a logical repetition of the contention resolution depicted. The outcome will vary with each contention resolution round due to the probabilistic nature of the random backoff number selection process. However, the average delay for any node within the queue will be a function of the speed of resolution of the contention resolution process, and the total number of nodes contending.

The present invention improves upon existing methodology by adding a field (the "MORE field") to each outgoing frame. In addition, the behavior of nodes participating in the protocol is modified. The MORE field in a frame sent by a transmitting node informs all the other nodes of the network as to whether or not additional frames exist in the transmitting node's transmission queue. Each node on the network will modify its behavior according to a modified set of protocol rules as provided in the following description. A general description of the inventive protocol will be described first, followed by a specific example.

When any outgoing frame is to be transmitted to the network by a transmitting node, the state of the transmit queue behind the outgoing frame is examined, and the result is placed into the MORE field of the outgoing frame. The MORE field therefore indicates whether additional frames are queued for transmission at this node.

In a protocol which separates classes of traffic into groups that compete for the network through differing logical collision domains, the MORE field indicates the state of the queue for all classes of traffic which compete in the same logical collision domain as the outgoing frame.

After successful transmission (i.e., transmission without collision), the transmitting node will not decrement the highest_backoff_slot_occupied variable, as it would normally otherwise do in existing protocols. Each of the receiving nodes will check the state of the MORE field in all received frames, and if set to indicate that more frames are queued at the sender's node, the receiving nodes will also forgo the otherwise normal decrementing of the highest_backoff_slot_occupied variable. However, in both cases, the backoff slot number for any pending transmissions will be decremented according to the existing protocol rules. Only the highest_backoff_slot_occupied variable is affected by the MORE field.

The effect of this modification is to maintain the one-wide queue of nodes that is created at the head of the network's transmission queue as a result of the n-ary tree collision resolution mechanism. In other words, the backoff mechanism serves to repetitively reduce the number of nodes at the head of the network queue until it reaches a value of one. Several rounds of collision resolution may have been necessary to establish a fair network queue ordering, and the addition of the MORE bit allows for this order to be maintained without incurring additional collisions as subsequent frames enter the queue. The result of this is that as long as any of the queues of the participating nodes contain additional frames for transmission, the number of collisions in the network will be reduced.

Since all queues are not likely to always be full, it is probable that some frames will appear on the network with the MORE field indicating an empty transmission queue. At some later point in time, however, a new frame may be queued into the transmission queue of a node that sent a negative MORE indication. This node will then add itself to the back of the existing queue without having been able to inform the other nodes of the network that it has done so. The effect of such behavior is only to increase the occupancy of any given backoff slot number, thereby reverting to the original behavior. However, any presence of frames with the MORE field indicating non-empty transmission queues will serve to reduce the overall average occupancy of each backoff slot number. In the best case, contention-free operation can be achieved for significant periods of time when all participants have multiple-entry transmission queues. Networks with higher average load will benefit the most from the use of the MORE field, because the transmission queues of the nodes on such a network will likely have a higher average level of occupancy.

Figure 5:
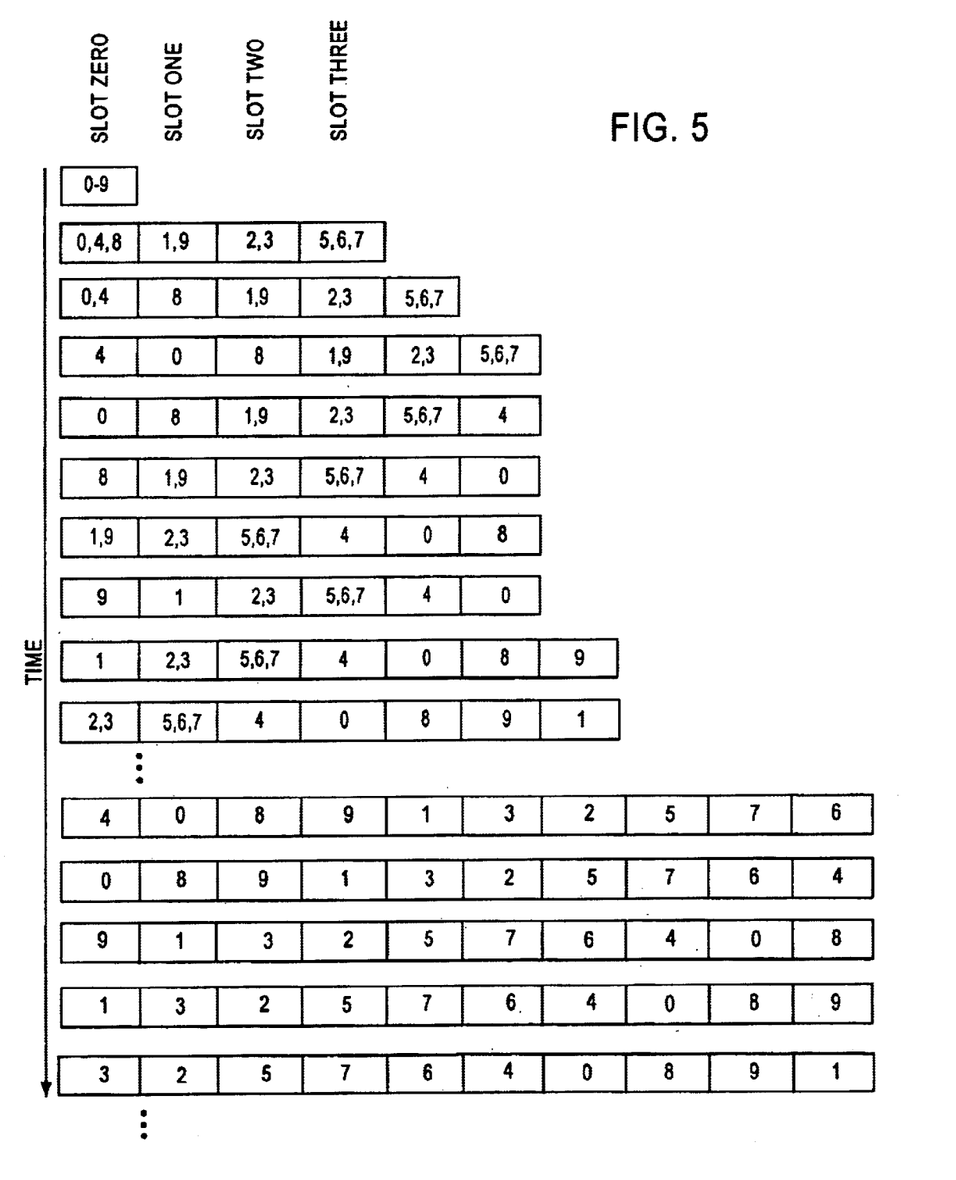
FIG. 5 is a diagram that depicts an example of node queue ordering in accordance with embodiments of the present invention.

FIG. 5 indicates the behavior of the present invention when all nodes have more than one frame in the transmission queue and hence, transmit their initial frames with the MORE field indicating the affirmative condition. The first row shows the same ten-way collision of nodes as provided in the example of FIG. 4 for existing protocols. The second row shows the same outcome from the random backoff slot selection process. It is not until the sixth row that a difference in behavior can be observed.

When node 0 has completed its winning transmission, it moves to a queue point behind node 4. This is because the highest_backoff_slot_occupied variable was not decremented in row 5 following the successful transmission and reception of node 4's transmission. As a result, node 0 sets the backoff slot number for its next transmit frame to the value of highest_backoff_slot_occupied; node 4 decrements its queued frame's backoff slot number from highest_backoff_slot_occupied to highest_backoff_slot_occupied minus one.

This process continues, with each node in turn occupying the tail end of the network transmission queue until all nodes each possess their own backoff slot. The network now proceeds to operate in a contention free mode as long as all nodes have multiple frames queued and are able to signal the affirmative MORE indication.

It is possible for various network topologies to experience localized bit error variance, such that while one network node may properly receive a frame with MORE field information, another node may receive the frame with an error, and the transmitting node receives no indication that an error has occurred somewhere in the network. Various noise sources are usually responsible for this sort of error. Uncontrolled network topologies can also introduce undesirable response characteristics that contribute to packet errors.

In order to minimize the risk from missed receptions that would otherwise cause a mis-synchronization of the highest_backoff_slot_occupied variable, an additional field is provided in all outgoing frames in certain embodiments of the invention: the "HBSO field". The HBSO field is filled with the value of the local highest_backoff_slot_occupied variable. By including this variable in all frames, all nodes of the network can compare their local values of highest_backoff_slot_occupied with the values from other nodes. This resolves the problem of variable mis-match which can result from missed frame reception. The rule of behavior for using the HBSO field is that receiving nodes must adopt the HBSO field value as a replacement for their highest_backoff_slot_occupied variable if the HBSO field value in the received frame is smaller than the local highest_backoff_slot_occupied variable value. If there is a frame queued for transmission at the receiving node whose assigned backoff slot number has a value larger than the value of the HBSO field in the received frame, then the backoff slot number for the queued frame must be reduced so that it matches the received HBSO field value.

In certain embodiments of the invention, the MORE field is not sent as a field within the transmitted frame, but rather, as a separate signal within a specific time-window following the transmission of the frame. This method offers another approach to effectively reducing the problem of mismatched highest_backoff_slot_occupied variables that can arise when bit errors occur during frame reception. By having a separate signal outside of the actual transmitted frame, it is possible to create a test for the MORE indication which is resolved by the presence or absence of the specific MORE signal field within a specific time window. Alternatively, the test could be for an affirmative symbol or a negative symbol. Such a test can be made to be much more robust than a test on a bit field that is within the transmitted frame because the MORE signal field can be sent with a lower symbol rate and a lower complexity modulation scheme, thereby yielding a lower bit error rate for the MORE signal. Even in the presence of bit errors that occur during the reception of the frame, the correct MORE indication could be ascertained. Receivers would necessarily include logic to time the interval following the frame in order to determine the value of the MORE field within the specific time window. The time interval between the end of the frame and the beginning of the MORE field signal could be as small as zero seconds. That is, the MORE field could be attached directly to the end of the frame. Given a differing modulation with lower bit error rate than that used in the rest of the frame, the MORE indication can readily be separated from the frame information.

Figure 6:
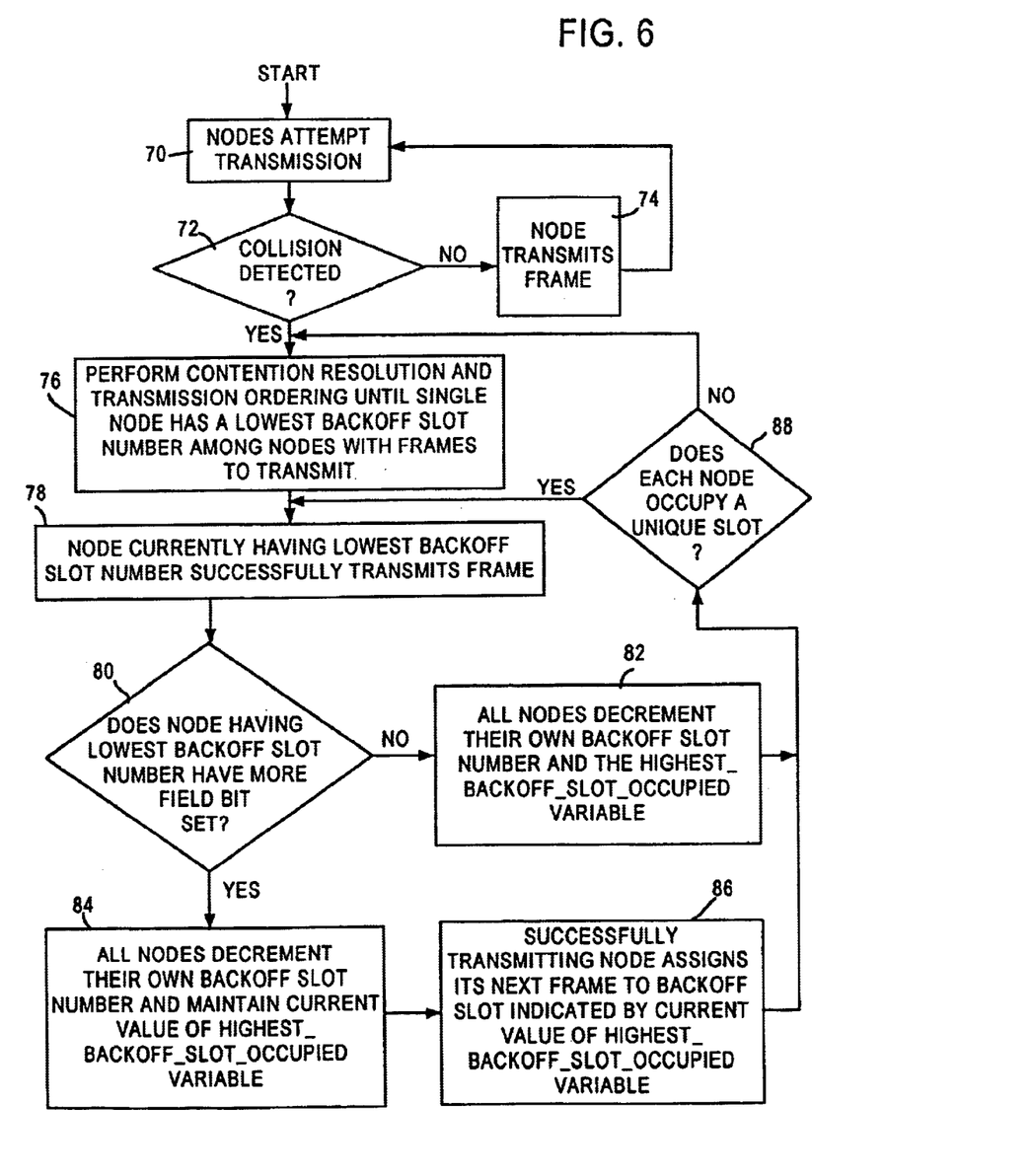
FIG. 6 is a flow diagram of a node queue ordering in accordance with embodiments of the present invention.

FIG. 6 is a flow chart depicting an exemplary process flow in accordance with embodiments of the present invention. The contention resolution and maintenance of the variables is controlled by logic in the media access controller depicted in the network interface of FIG. 2, for example. The media access controllers of the individual nodes therefore, in certain embodiments, contain the logic to carry out the method of the present invention as described above and depicted in FIG. 6. This configuration is exemplary only, however, as other hardware may be used to operate a node in accorddance with the described invention.

When any node has a frame to transmit, it will attempt a transmission, in accordance with the network medium access protocol. A plurality of nodes may attempt transmission simultaneously, as depicted in step 70. If there is a simultaneous attempt to access the media, the network interfaces will detect a collision, in step 72. If no collision is detected, then the single node performs a successful transmission (step 74).

Assuming that a collision is detected by the network interfaces in step 72, a contention resolution and transmission ordering is performed until a single node has a lowest backoff slot nmber among all the nodes with frames to transmit (step 76). Once only one of the nodes has the lowest backoff slot number, that node performs a successful transmission of that frame (step 78). It is then determined in step 80 whether that successfully transmitting node, having the lowest backoff slot number, had its MORE field bit set. This would indicate that the successfully transmitting node had at least one additional frame to transmit.

If the MORE field bit is not set (NO), then all of the nodes decrement their own backoff slot number and the highest_backoff_slot_occupied variable (step 82). It is then determined in step 88 whether each node occupies a unique slot. If not, the process returns to step 76 to continue transmission ordering. If each node occupies its own slot, then the transmission ordering is complete and the process returns to step 78 so that the node that now has the lowest backoff slot may make a successful transmission of its frame.

If the MORE field bit is set (YES), indicating that the successfully transmitting node has another frame to transmit, then all of the nodes decrement their own backoff slot number. However, in this case each node also maintains the current value of the highest_backoff_slot_occupied variable (step 84).

The successfully transmitting node assigns its next frame to the backoff slot indicated by the current value of the highest_backoff_slot_occupied (step 86), which has been maintained in accordance with embodiments of the present invention. This maintains the ordering created in step 76 and avoids the re-contention for media access as long as each node has additional frames to transmit.

The process then proceeds to step 88, to determine whether each node occupies its own slot, and if so, proceeding to step 78. If not, the process proceeds to step 76.

With the process of the present invention, and the network interfaces configured in accordance with the present invention, a reduction in collisions, latency and latency jitter is achieved. This is accomplished through maintaining a contention resolution derived transmission ordering.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A method of maintaining a created transmission order for transmissions of additional data frames by a plurality of nodes coupled to a communication network, the method comprising the steps of:

a) detecting a collision on the network of frames attempted to be transmitted by the nodes;

b) performing a contention resolution among the nodes that attempted to transmit the colliding frames such that the nodes have changeable backoff slot numbers that range from a lowest backoff slot number to a highest backoff slot number, each node transmitting a frame without collision when that node is the only node that has a lowest backoff slot number among the nodes with a frame to transmit, with all the other nodes decrementing their own backoff slot number upon the successful transmission of the frame by the only node with the lowest backoff slot number;

c) determining whether the node that has successfully transmitted the frame has another frame to transmit;

d) assigning the node that has successfully transmitted the frame to have a highest backoff slot number among the nodes, if that node has another frame to transmit;

e) repeating steps a)–d) until each node has a unique backoff slot number to create a transmission order; and f) maintaining the created transmission order for transmissions of additional frames, when the nodes that attempted to transmit the colliding frames indicate during transmission of the colliding frames that the nodes have additional frames to transmit.

2. The method of claim 1, wherein each node transmits with each frame an indication whether the node has an additional frame to transmit.

3. The method of claim 2, wherein the indication is contained in a field of the frame designated for additional frame information.

4. The method of claim 3, wherein each node maintains a backoff slot number for the frame that the node is currently attempting to transmit.

5. The method of claim 4, wherein each node maintains a variable that indicates a highest backoff slot currently occupied by any of the nodes prior to successful transmission of a frame by any node.

6. The method of claim 5, wherein each node decrements the backoff slot number that the node is maintaining, and maintains a current value of the highest backoff slot variable, when a node successfully transmits a frame without collision and the information contained in the frame indication field of the successfully transmitted frame indicates that the node has an additional frame to transmit.

7. The method of claim 6, wherein each node decrements the backoff slot number that the node is maintaining, and decrements the current value of the highest backoff slot variable, when a node successfully transmits a frame without collision and the information contained in the frame indication field of the successfully transmitted frame indicates that the node does not have an additional frame to transmit.

8. The method of claim 7, wherein the node that successfully transmitted a frame, if the information contained in the field of the successfully transmitted frame indicates that the successfully transmitting frame has an additional frame to transmit, is assigned the highest backoff slot for the additional frame, the highest backoff slot being indicated by the current value of the variable.

9. The method of claim 8, wherein each frame has a highest backoff slot occupied field that contains a value of the variable.

10. The method of claim 9, wherein each node compares the value of the variable that the node maintains to the value of the variable contained in the highest backoff slot occupied field of each frame received at the node, and changes the value of the variable the node maintains to the value of the variable contained in the highest backoff slot occupied field of a frame received at the node if the value of the variable contained in the highest backoff slot occupied field of the received frame is smaller than the value of the variable maintained by the node.

11. The method of claim 10, wherein each node compares the value of the variable contained in the highest backoff slot occupied field of each frame received at the node with the backoff slot number of that node, and changes the backoff slot number to equal the value of the variable contained in the highest backoff slot occupied field of a frame received at the node if the value of the variable contained in the highest backoff slot occupied field of the received frame is smaller than the backoff slot number of that node.

12. The method of claim 2, wherein the indication is contained in a signal separate from each frame, within a specified time-window following the transmission of each frame.

13. The method of claim 12, wherein the signal has a lower symbol rate and lower complexity modulation than the symbol rate and modulation of each frame.

14. A method of maintaining a created transmission order for transmissions of additional data frames by a plurality of nodes coupled to a communication network, the method comprising the steps of:
   a) detecting a collision on the network of frames attempted to be transmitted by the nodes;
   b) performing a contention resolution among the nodes that attempted to transmit the colliding frames such that the nodes have changeable backoff slot numbers that range from a lowest backoff slot number to a highest backoff slot number, each node transmitting a frame without collision when that node is the only node that has a lowest backoff slot number among the nodes with a frame to transmit, with all the other nodes decrementing their own backoff slot number upon the successful transmission of the frame by the only node with the lowest backoff slot number;
   c) determining whether the node that has successfully transmitted the frame has another frame to transmit;
   d) assigning the node that has successfully transmitted the frame to have a highest backoff slot number among the nodes, if that node has another frame to transmit;
   e) repeating steps a)–d) until each node has a unique backoff slot number to create a transmission order, and
   f) maintaining the created transmission order for transmissions of additional frames, when the nodes that attempted to transmit the colliding frames indicate during transmission of the colliding frames that the nodes have additional frames to transmit;
   wherein each node transmits with each frame an indication whether the node has an additional frame to transmit;
   wherein the indication is contained in a field of the frame designated for additional frame information;
   wherein each node maintains a backoff slot number for the frame that the node is currently attempting to transmit;
   wherein each node maintains a variable that indicates a highest backoff slot currently occupied by any of the nodes prior to successful transmission of a frame by any node;
   wherein each node decrements the backoff slot number that the node is maintaining, and maintains a current value of the highest backoff slot variable, when a node successfully transmits a frame without collision and the information contained in the frame indication field of the successfully transmitted frame indicates that the node has an additional frame to transmit;
   wherein each node decrements the backoff slot number that the node is maintaining, and decrements the current value of the highest backoff slot variable, when a node successfully transmits a frame without collision and the information contained in the frame indication field of the successfully transmitted frame indicates that the node does not have an additional frame to transmit;
   wherein the node that successfully transmitted a frame, if the information contained in the field of the successfully transmitted frame indicates that the successfully transmitting frame has an additional frame to transmit, is assigned the highest backoff slot for the additional frame, the highest backoff slot being indicated by the current value of the variable;
   wherein each frame has a highest backoff slot occupied field that contains a value of the variable;
   wherein each node compares the value of the variable that the node maintains to the value of the variable contained in the highest backoff slot occupied field of each frame received at the node, and changes the value of the variable the node maintains to the value of the variable contained in the highest backoff slot occupied field of a frame received at the node if the value of the variable contained in the highest backoff slot occupied field of the received frame is smaller than the value of the variable maintained by the node;
   wherein each node compares the value of the variable contained in the highest backoff slot occupied field of each frame received at the node with the backoff slot number of that node, and changes the backoff slot number to equal the value of the variable contained in the highest backoff slot occupied field of a frame received at the node if the value of the variable contained in the highest backoff slot occupied field of the received frame is smaller than the backoff slot number of that node;
   wherein the indication is contained in a signal separate from each frame, within a specified time-window following the transmission of each frame;
   wherein the signal has a lower symbol rate and lower complexity modulation than the symbol rate and modulation of each frame;
   wherein the backoff slot number logic and the variable logic are further configured to decrement the backoff slot number that the node is maintaining and a current value of the highest backoff slot variable, when any node on the network successfully transmits a frame without collision and the information contained in the frame indication field of the successfully transmitted frame indicates that the successfully transmitting node does not have an additional frame to transmit.

* * * * *